(12) United States Patent
Laporte et al.

(10) Patent No.: US 6,778,752 B2
(45) Date of Patent: Aug. 17, 2004

(54) BELOW GRADE CLOSURE FOR LOCAL CONVERGENCE POINT

(75) Inventors: Richard B. Laporte, Ft. Worth, TX (US); Diana Rodriguez, Alvarado, TX (US); Andrew D. Hoflich, Plano, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 10/160,796

(22) Filed: May 31, 2002

(65) Prior Publication Data

US 2003/0223725 A1 Dec. 4, 2003

(51) Int. Cl.[7] .................................................. G02B 6/00
(52) U.S. Cl. ....................................................... 385/135
(58) Field of Search ................................. 385/134, 135, 385/136, 137

(56) References Cited

U.S. PATENT DOCUMENTS

| | | | | |
|---|---|---|---|---|
| 5,146,532 A | * | 9/1992 | Hodge | 385/136 |
| 5,644,671 A | | 7/1997 | Goetter et al. | 385/135 |
| 5,734,776 A | | 3/1998 | Puetz | 385/134 |
| 5,825,964 A | * | 10/1998 | Goetter et al. | 385/135 |
| 6,052,504 A | * | 4/2000 | Frohlich et al. | 385/134 |
| 6,193,420 B1 | * | 2/2001 | Sikorski, Jr. | 385/55 |
| 6,226,436 B1 | | 5/2001 | Daoud et al. | 385/135 |
| 6,249,632 B1 | | 6/2001 | Wittmeier, II et al. | 385/135 |
| 6,249,633 B1 | | 6/2001 | Wittmeier, II et al. | 385/135 |
| 6,249,636 B1 | * | 6/2001 | Daoud | 385/137 |
| 6,259,852 B1 | | 7/2001 | Daoud et al. | 385/135 |
| 6,353,697 B1 | * | 3/2002 | Daoud | 385/136 |
| 6,526,210 B1 | * | 2/2003 | Harrison et al. | 385/134 |
| 6,539,160 B2 | * | 3/2003 | Battey et al. | 385/135 |
| 2002/0051616 A1 | * | 5/2002 | Battey et al. | 385/135 |

FOREIGN PATENT DOCUMENTS

EP 0962800 A2 12/1999 ............ G02B/6/44

OTHER PUBLICATIONS

Corning Cable Systems Product Information (SRP–003–589), SCC–6 and SCC–8 Coupler Splice Closures, Draft D of Issue 1, May 2001, pp. 1–21.

Panduit® Adhesive Backed Mounting Devices, Product Sheet, Catalog p. 106.

3M Dual Lock Reclosable Fasteners, Product Information, 2 pages.

* cited by examiner

Primary Examiner—Tulsidas C. Patel
(74) Attorney, Agent, or Firm—Christopher C. Dremann

(57) ABSTRACT

A closure interconnects at least one optical fiber of a feeder cable with two or more optical fibers of a distribution cable at a local convergence point in an optical network. The closure includes a frame defining a longitudinal axis and a plurality of mounting surfaces. The closure further includes a fiber coupling area adjacent one of the mounting surfaces and a fiber management area adjacent another one of the mounting surfaces. The fiber coupling area includes at least one coupler module for splitting an optical signal carried on the optical fiber of the feeder cable into different optical signals carried on the two or more optical fibers of the distribution cable. The optical fibers of the distribution cable may be pre-connectorized drop cables, connectorized pigtails that are field terminated to fanout connectors, or optical fibers that are field terminated by mechanically splicing the optical fibers to drop cables.

30 Claims, 10 Drawing Sheets

BELOW GRADE CLOSURE FOR LOCAL CONVERGENCE POINT

FIELD OF THE INVENTION

The present invention relates generally to enclosures for interconnecting at least one optical fiber of a feeder cable with two or more optical fibers of a distribution cable. More particularly, the invention relates to a closure comprising a plurality of coupler modules for splitting an optical signal carried by an optical fiber of a feeder cable into different optical signals carried on two or more optical fibers of a distribution cable at a local convergence point in an optical network.

BACKGROUND OF THE INVENTION

Telecommunications service providers are currently developing networks consisting entirely of fiber optic components to meet the demand for high bandwidth communications service to businesses and homes. These "all-optical" telecommunications networks require a line of service enclosures, referred to herein as "closures," along the network that are located at access points in the field. Each such location is referred to herein as a "local convergence point." A closure is utilized at a local convergence point to interconnect optical fibers of a feeder cable from a service provider with optical fibers of one or more distribution cables. In some instances, optical fibers of the feeder cable are connected to optical fibers of drop cables that are routed directly to the business or home of a subscriber of the communications service. In other instances, optical fibers of the feeder cable are connected to optical fibers of a cable that is routed from the closure to yet another local convergence point along the optical network to serve as a further feeder cable for additional drop cables. The further feeder cable is sometimes referred to in the art as a "branch" cable. The optical network may be configured in many different ways, but typically, is configured with a plurality of feeder cables from the service provider having optical fibers that are interconnected with optical fibers of distribution cables at various local convergence points. The distribution cables serve as drop cables routed directly to communications equipment belonging to subscribers, or as branch cables routed to other local convergence points. As used herein, the term "distribution cable" includes both drop cables and branch cables, as those terms are presently understood by one skilled in the art. Furthermore, the term "optical fiber" or "optical fibers" as used herein includes coated and uncoated (i.e., bare) single fibers, jacketed fibers (e.g., tight-buffered and loose buffered), multiple fibers, multiple fiber ribbons, and fiber optic cables containing one or more optical fibers.

While fiber optic networks have traditionally served as the back bone or trunk line of telecommunication networks to transmit signals over relatively long distances, all-optical networks are gradually being extended closer to the end points of the network. In this regard, fiber optic networks are being developed that deliver fiber-to-the-home, fiber-to-the-business, fiber-to-the-desk, and the like. In each of these applications, the closure must be capable of interconnecting optical fibers of the feeder cables with optical fibers of the distribution cable to establish the desired optical connections. In existing optical networks, the optical fibers of the feeder cable are typically interconnected with the optical fibers of the distribution cable within a splice closure that is buried underground, mounted in an above-ground pedestal, mounted on a telephone pole, or suspended from an aerial telephone cable strand. The splice closure generally includes a frame defining a longitudinal axis that is enclosed by a cylindrical or dome-shaped cover. The cover is intended to protect the optical fiber connections from adverse environmental conditions, while at the same time optimize the number of connections that can be made within the closure. In a splice closure, however, the optical fibers of the feeder cable are spliced in a one-to-one relationship with the optical fibers of the distribution cable. Thus, the number of optical connections that can be made within the splice closure, commonly referred to in the art as the "fiber capacity" of the closure, is limited by the number of one-to-one splices that can be accomplished within the volume constraints of the closure. As the all optical network proliferates, it is anticipated that the number of optical connections required to be made within the closure will soon exceed the fiber capacity of conventional splice closures.

It is further anticipated that the number of optical fibers of the feeder cable will be required to increase dramatically as the all-optical network proliferates. Since many feeder cables are already installed in fiber optic cable ducts that are buried underground, and because there is oftentimes a physical or functional limit to the number of optical fibers that can be contained together within a feeder cable, there will soon be too few optical fibers from service providers to meet the increasing demand for high bandwidth communications service to businesses and homes. It will therefore be necessary, for example, for service providers to install additional feeder cables within existing fiber optic cable ducts or to invest in the construction of additional fiber optic cable ducts to carry the additional feeder cables. In either case, substantial capital expense will have to be incurred by the service provider, and ultimately, passed on to the subscriber in the form of higher cost communications service.

Along with the proliferation of the all-optical network, there will be certainly be an increased need for a field technician to reconfigure the optical connections within the splice closure. Although spliced optical connections can be reconfigured, it is time consuming for the field technician to identify the appropriate optical fibers of the feeder cable and the distribution cable. Furthermore, it typically requires the expertise of a highly trained field technician to reconfigure a conventional splice closure at an access point in the field. As a result, it is costly for a service provider to frequently dispatch a skilled field technician to reconfigure the optical connections within a conventional splice closure. Once again, the additional expense incurred by the service provider to reconfigure the splice closure will ultimately be passed on to the subscriber in the form of higher cost communications service. Accordingly, there is a need for a closure that resolves the aforementioned difficulties associated with the proliferation of an all-optical telecommunications network. The present invention solves these, as well as other, problems by providing a closure for interconnecting at least one optical fiber of a feeder cable with two or more optical fibers of a distribution cable at a local convergence point in an optical network. The closure permits the optical connections to be made in a space efficient, organized and timely manner that does not require a highly skilled field technician to reconfigure the optical connections within the closure.

BRIEF DESCRIPTION OF THE DRAWINGS

The present invention will be described in conjunction with the accompanying drawings in which like reference numerals represent the same or similar parts in the different views. The drawings, which are incorporated in and constitute a part of this specification, provide further understanding of the invention, illustrate various embodiments of the invention, and, together with the description, help to fully explain the principles and objectives thereof. More specifically.

DETAILED DESCRIPTION OF THE INVENTION

Figure 1:
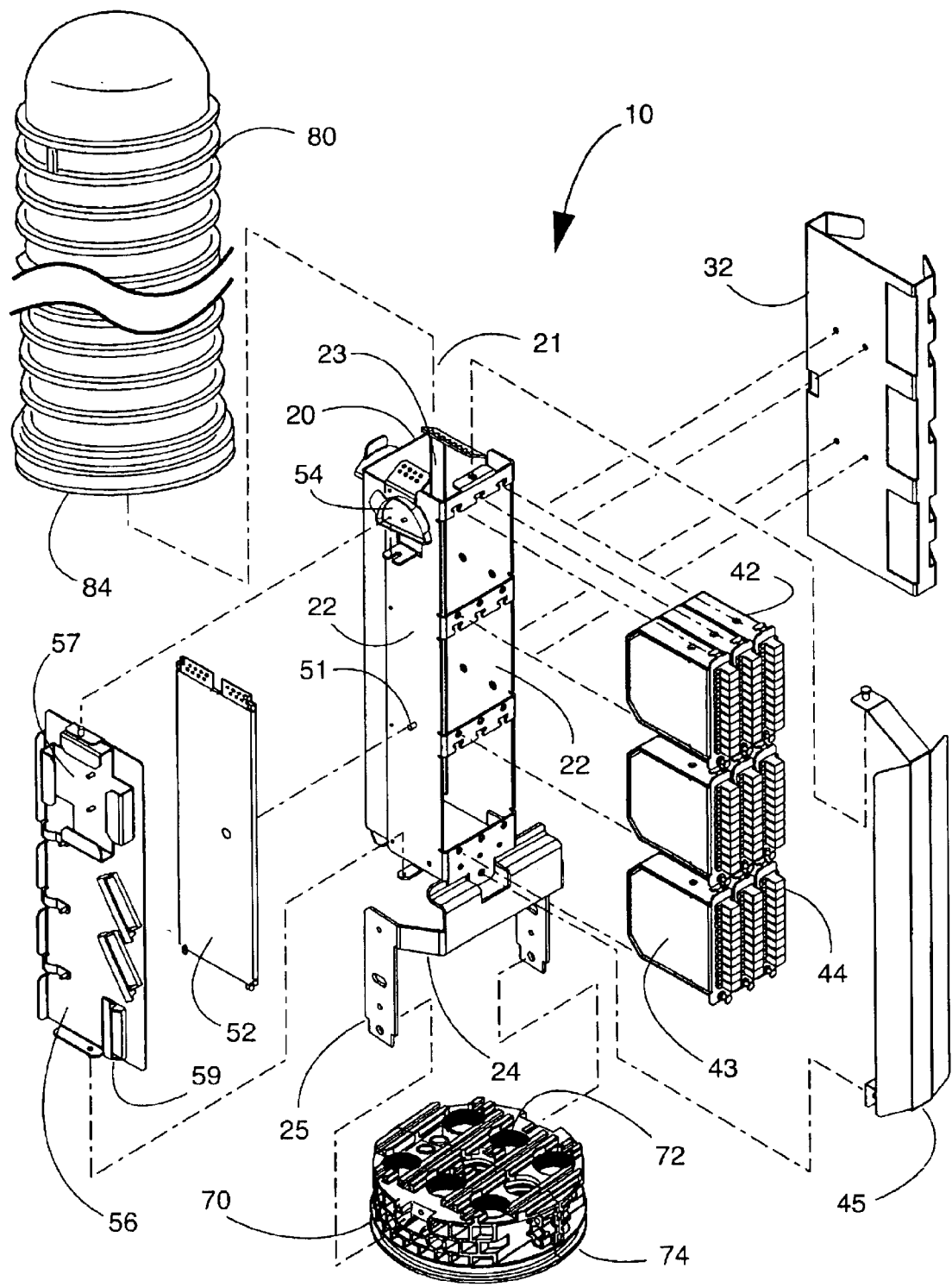
FIG. 1 is an exploded perspective view of a closure constructed in accordance with the invention for use at a local convergence point in an optical network.

The invention is described more fully hereinafter with reference to the accompanying drawings, in which various embodiments of the invention are shown. The invention may, however, be embodied in many different forms, and therefore, should not be construed as being limited to the embodiments described and shown herein. Illustrative embodiments are set forth herein so that this description will be thorough and complete, and will fully convey the intended scope of the claimed invention while enabling those skilled in the art to make and practice the invention without undue experimentation.

Referring now to FIGS. 1–6, an exploded perspective view of a closure, indicated generally at 10, constructed in accordance with one embodiment of the invention is shown. The closure 10 permits an optical fiber of a feeder cable 12 (FIGS. 2–6) to be interconnected with two or more optical fibers of a distribution cable 16 (FIGS. 2–6) at a local convergence point in an optical network. As used herein, the term "local convergence point" refers to a location along the optical network that provides a field technician with access to the optical connections between the feeder cable 12 and the distribution cable 16. A typical optical network is constructed with a line of closures 10 along the network that interconnect optical fibers of the feeder cable 12 with optical fibers of drop cables that provide telecommunications services to homes and businesses, or with optical fibers of branch cables leading to other closures 10 along the network. The closure 10 may be buried below ground, installed in an aerial location, for example mounted on a telephone pole or hung from an aerial cable strand (i.e., an aerial closure), or disposed in a larger enclosure, such as an above ground pedestal. The closure 10 shown and described herein is preferably buried, and thus, is commonly referred to as a "below grade" closure. Regardless, the closure 10 provides a convenient access point in the optical network for a field technician to initially install and subsequently reconfigure the optical fiber connections between the feeder cable 12 and the distribution cable 16. Although the closure 10 illustrated in the figures is a canister, or "butt" type closure, it may have other configurations, such as an in-line closure or distribution terminal, without departing from the intended spirit or scope of the invention.

As is well known and understood in the art, the feeder cable 12 may be a main feeder cable from the service provider, or may be a branch cable from a distribution terminal or another closure 10 along the optical network. The feeder cable 12 comprises at least one, and preferably, a plurality of flexible buffer tubes 13 (FIGS. 2–6) each containing at least one, and preferably a plurality of optical fibers connected to communications transmission equipment from the service provider. The distribution cable 16 comprises at least one, and preferably a plurality of flexible buffer tubes 17 (FIGS. 2–6). The buffer tubes 17 may comprise one or more drop cables, each containing at least one optical fiber connected to communications equipment at a subscriber's premises, such as a home or business. The buffer tubes 17 may also comprise one or more branch cables, each containing at least one optical fiber connected to, for example, another closure 10 along the optical network. The buffer tubes 13 of the feeder cable 12 and the buffer tubes 17 of the distribution cable 16 may contain any type, or types, of optical fibers, such as tight-buffered optical fibers, loose-buffered optical fibers, and ribbon fiber. As such, the term "optical fiber" or "optical fibers" as used herein is intended to include all types of optical fibers, including individual coated optical fibers, individual uncoated (i.e., bare) optical fibers, tight-buffered optical fibers, loose-buffered optical fibers, optical fibers in the form of a multi-fiber ribbon, or any other known expedient of a light transmitting fiber medium. Additionally, the optical fibers may have various diameters, including for example diameters of 900 micron, 2 mm and 3 mm.

As best shown in FIG. 1, the closure 10 comprises a frame 20, an end cap 70 secured to one end of the frame 20, and a dome-shaped housing, or cover, 80. The cover 80 fits over the frame 20 and is secured to the end cap 70 to protect the optical fiber connections within the closure 10 from adverse environmental effects, such as dirt, dust, and insect and rodent infestation, and to provide a relatively water-tight seal with the end cap 70. The frame 20 is made of a lightweight, yet structurally rigid material, such as metal (e.g., aluminum), plastic, or thermoplastic. The end cap 70 and the cover 80 are each made of a lightweight, yet rigid material, such as plastic, thermoplastic, or a composite (e.g., fiber and resin) material. The frame 20 is generally elongate and defines a longitudinal axis 21. The frame 20 further defines a plurality of mounting surfaces 22 (two visible in FIG. 1) for receiving fiber storage, fiber coupling, fiber management, and fiber connecting components of the closure 10, as will be described hereinafter. As shown in the illustrative embodiments described herein, the frame 20 defines a total of four mounting surfaces 22. As such, the frame 20 is divided into four quadrants, or areas, for mounting the fiber storage, fiber coupling, fiber management, and fiber connecting components onto the frame 20 of the closure 10. In particular, the closure 10 shown and described herein comprises a fiber storage area 30, a fiber coupling area 40, a fiber management area 50, and a fiber connecting area 60 (FIGS. 2–6). The mounting surfaces 22 are generally planar and are arranged in parallel, spaced apart pairs that are perpendicular to one another. As a result, the mounting surfaces 22 form a box-shaped structure having a generally square cross-section that defines an interior cavity 23. The frame 20, however, may define any convenient number of mounting surfaces 22 and the mounting surfaces 22 may be arranged in any suitable configuration. For example, the frame 20 may define a total of only three mounting surfaces 22 by combining the fiber management area and the fiber connecting area, and the mounting surfaces 22 may be arranged in a triangular configuration.

At least one of the mounting surfaces 22 is secured to a base 24 comprising one or more outwardly extending legs 25 for attaching the frame 20 to the end cap 70. As shown, the mounting surface 22 adjacent the fiber coupling area 40 is attached to the base 24. However, the frame 20 may be attached to the end cap 70 in any conventional manner that permits the feeder cable 12 and the distribution cable 16 to be unsheathed and adequately strain relieved to the frame 20 or the end cap 70. The end cap 70 is disc-shaped and is preferably formed of mating halves that define a plurality of openings, or ports, 72 for receiving fiber optic cables therethrough. As shown, the end cap 70 has a plurality of cable ports 72 configured to receive the feeder cable 12 and at least one distribution cable 16 therethrough. Typically, one of the cable ports 72 will receive the feeder cable 12 and another of the cable ports 72 will receive the distribution cable 16. However, any of the remaining cable ports 72 may receive an additional feeder cable 12 (such as in a taut-sheath, mid-span application) or an additional distribution cable 16 comprising one or more drop cables or branch cables. For example, the cable ports 72 may receive a main feeder cable 12 from the service provider, one or more drop cables leading to a subscriber's premises, such as a home or business, and one or more branch cables leading to another closure 10 along the optical network. The cable ports 72 comprise means (not shown) for creating a relatively fluid-tight seal between the end cap 70 and the feeder cable 12 and between the end cap 70 and each distribution cable 16. The end cap 70 further comprises a flange 74 that extends radially outwardly to receive a complimentary flange 84 on the open end of the dome-shaped cover 80. Typically, an annular clamp (not shown) is positioned over the flange 84 of the cover 80 and the flange 74 of the end cap 70 to secure the cover 80 to the end cap 70. The unused cable ports 72 are preferably closed off so that the end cap 70 and the cover 80 define a relatively water-tight enclosure for the frame 20 and the optical fiber connections housed within the closure 10 with the feeder cable 12 and the distribution cable 16 installed. The configuration of the base 24, the end cap 70, and the cover 80 is shown for purposes of illustration only, and is not intended to limit the scope of the invention in any way. The design and functionality of the base 24 of frame 20, the end cap 70, and the cover 80 are well known and form no part of the present invention.

Figure 2:
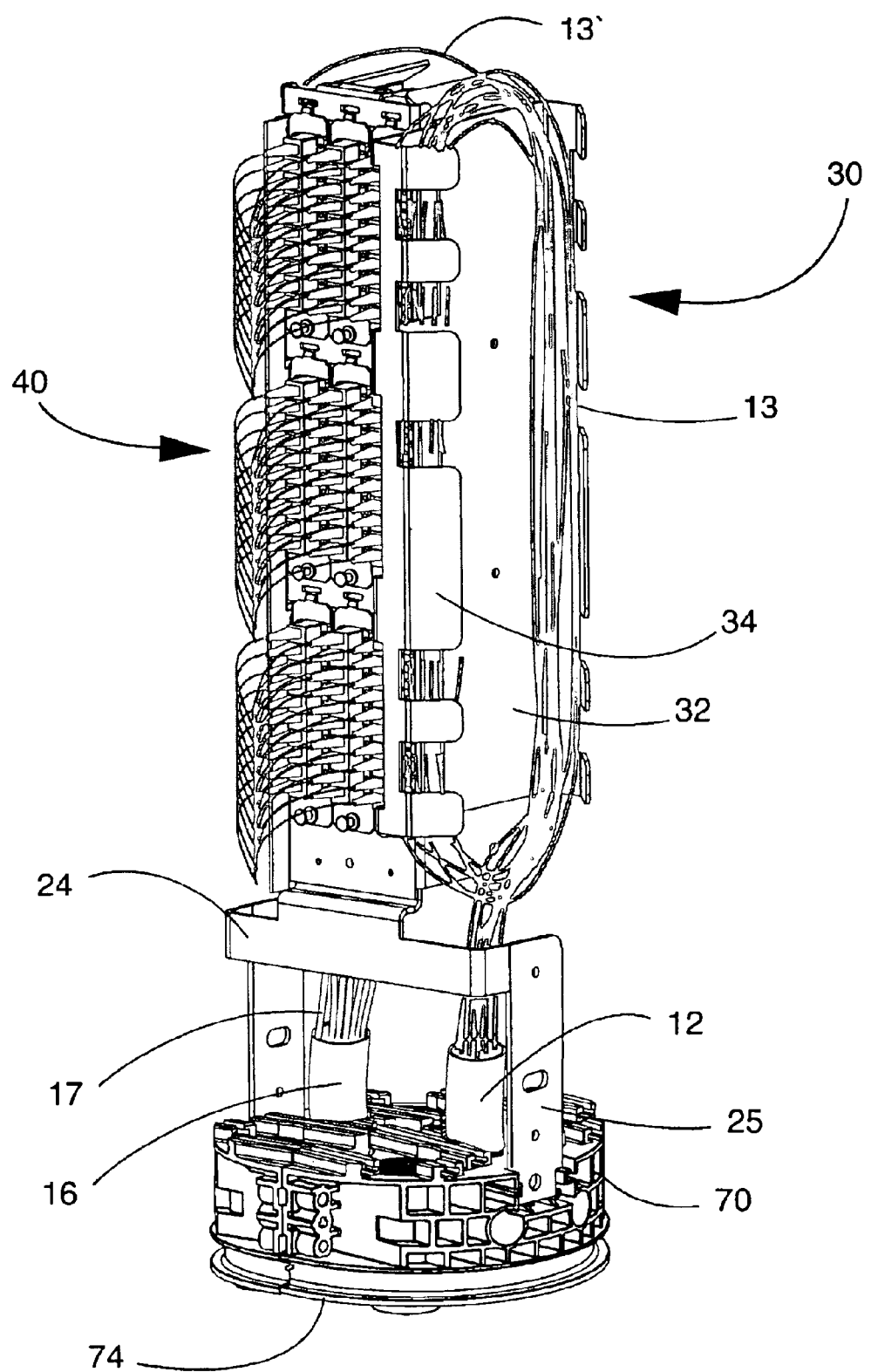
FIG. 2 is a perspective view of the fiber storage area and the fiber coupling area of the closure of FIG. 1.

FIG. 2 is a perspective view of the closure 10 showing the fiber storage area, indicated generally at 30, and the fiber coupling area, indicated generally at 40. As shown, the fiber storage area 30 comprises a slack storage basket 32 attached to the frame 20 adjacent one of the mounting surfaces 22 for retaining a slack length of fiber optic cable. In particular, the slack storage basket 32 retains a plurality of slack lengths of the buffer tubes 13 of feeder cable 12. The feeder cable 12 is passed through one of the cable ports 72 of the end cap 70 and is strain relieved to the frame 20 or the end cap 70 in a known manner, for example by one or more cable ties. A portion of the sheath of the feeder cable 12 is removed to expose a suitable length of the buffer tubes 13. One of the buffer tubes, indicated by the reference numeral 13', is routed out of the fiber storage area 30 to the fiber management area 50, for a purpose to be described hereinafter. The buffer tube 13' is preferably routed from the fiber storage area 30 to the fiber management area 50 between the free end of the frame 20 and the inside of the cover 80. However, the buffer tube 13' may be routed from the fiber storage area 30 to the fiber management area 50 in any expedient manner that does not exceed the minimum bend radius of the optical fibers within the buffer tube 13'. The unused buffer tubes 13 of the feeder cable 12 are terminated within the closure 10, as shown, or are routed from the fiber storage area 30 out of the closure 10. Preferably, the unused buffer tubes 13 are routed out of the closure 10 within the sheathed downstream portion of the feeder cable 12. Although not shown, the downstream portion of the feeder cable 12 exits the closure 10 through one of the other cable ports 72 of the end cap 70 in a manner commonly referred to in the art as a taut-sheath, mid-span application. The slack storage basket 32 preferably comprises at least one outer flange 34 for retaining the coiled lengths of buffer tubes 13 within the space between the outer surface of the slack basket 32 and the cover 80. However, the slack basket 32 may comprise at least one routing guide, routing clip, or cable tie to retain the coiled lengths of buffer tubes 13 within the fiber storage area 30. As shown, the slack basket 32 comprises a plurality of flanges 34 that are angled inwardly to retain the coiled lengths of buffer tubes 13 between the outer surface of the slack storage basket 32 and the flanges 34.

Figure 3A:
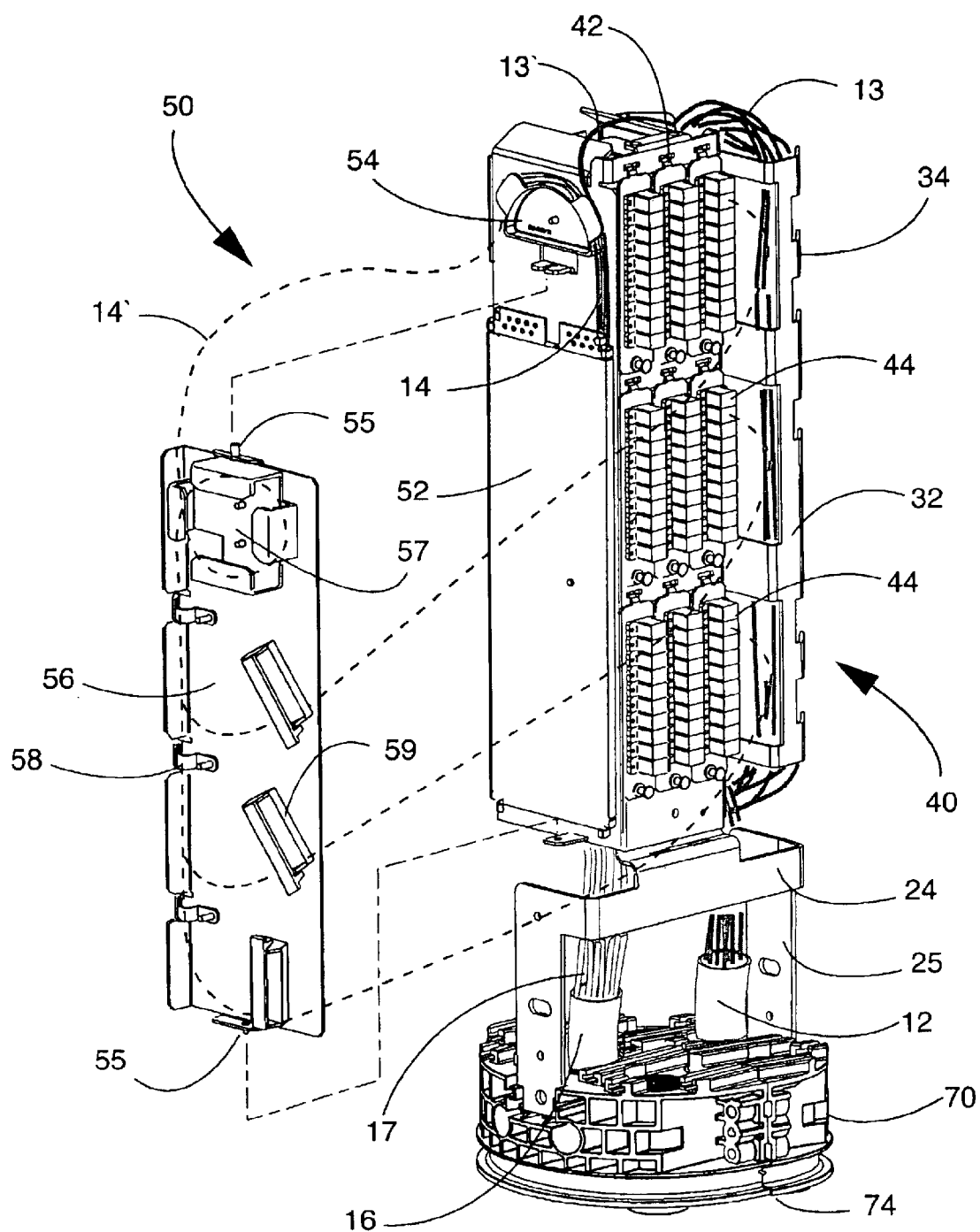
FIG. 3a is a perspective view of the fiber coupling area and the fiber management area of the closure of FIG. 1 shown with the fiber routing panel detached to expose the splice tray and illustrating the routing of a typical input optical fiber.
Figure 3B:
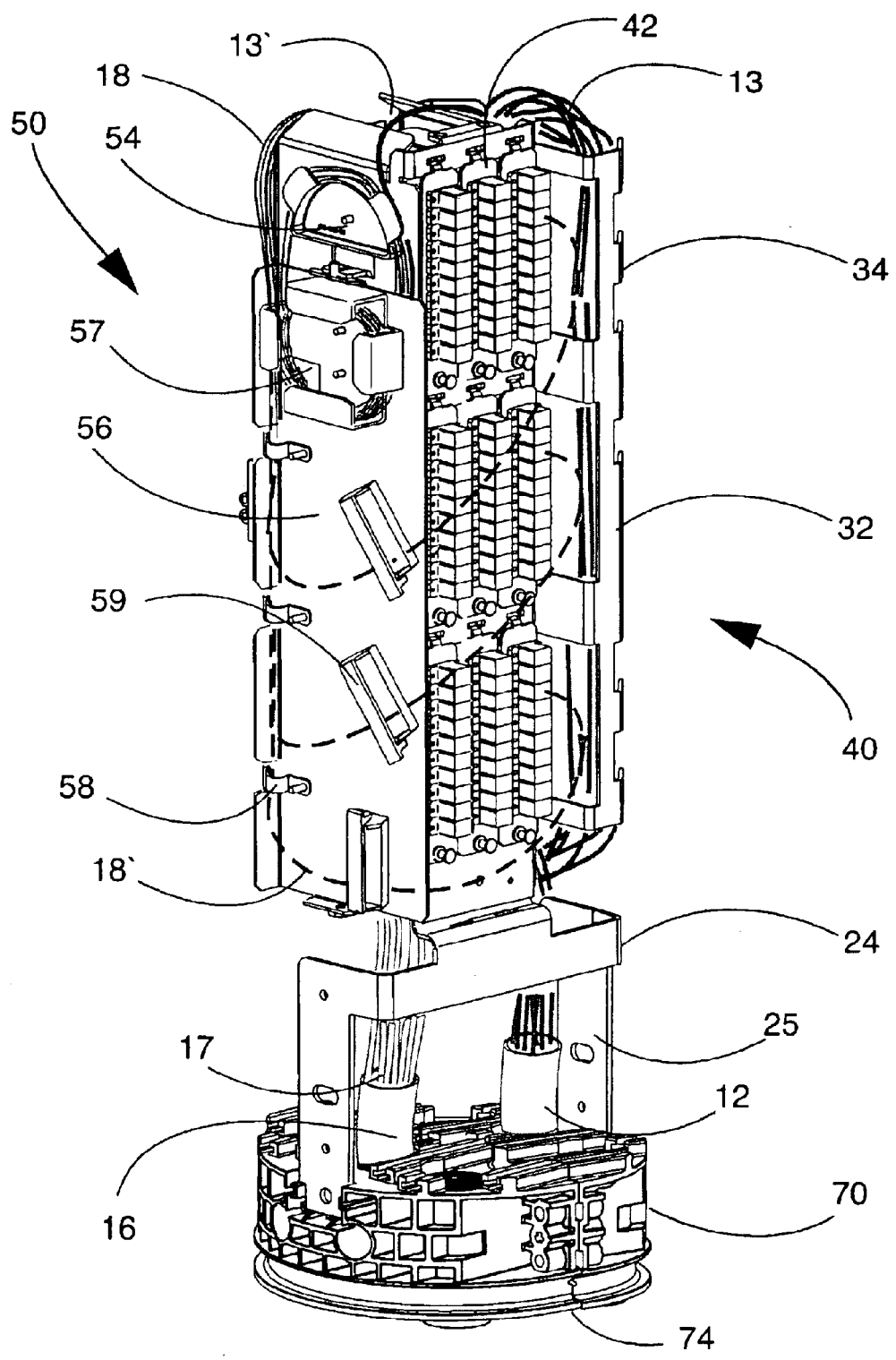
FIG. 3b is a perspective view of the fiber coupling area and the fiber management area shown with the fiber routing panel attached and illustrating the routing of a typical output optical fiber.
Figure 3C:
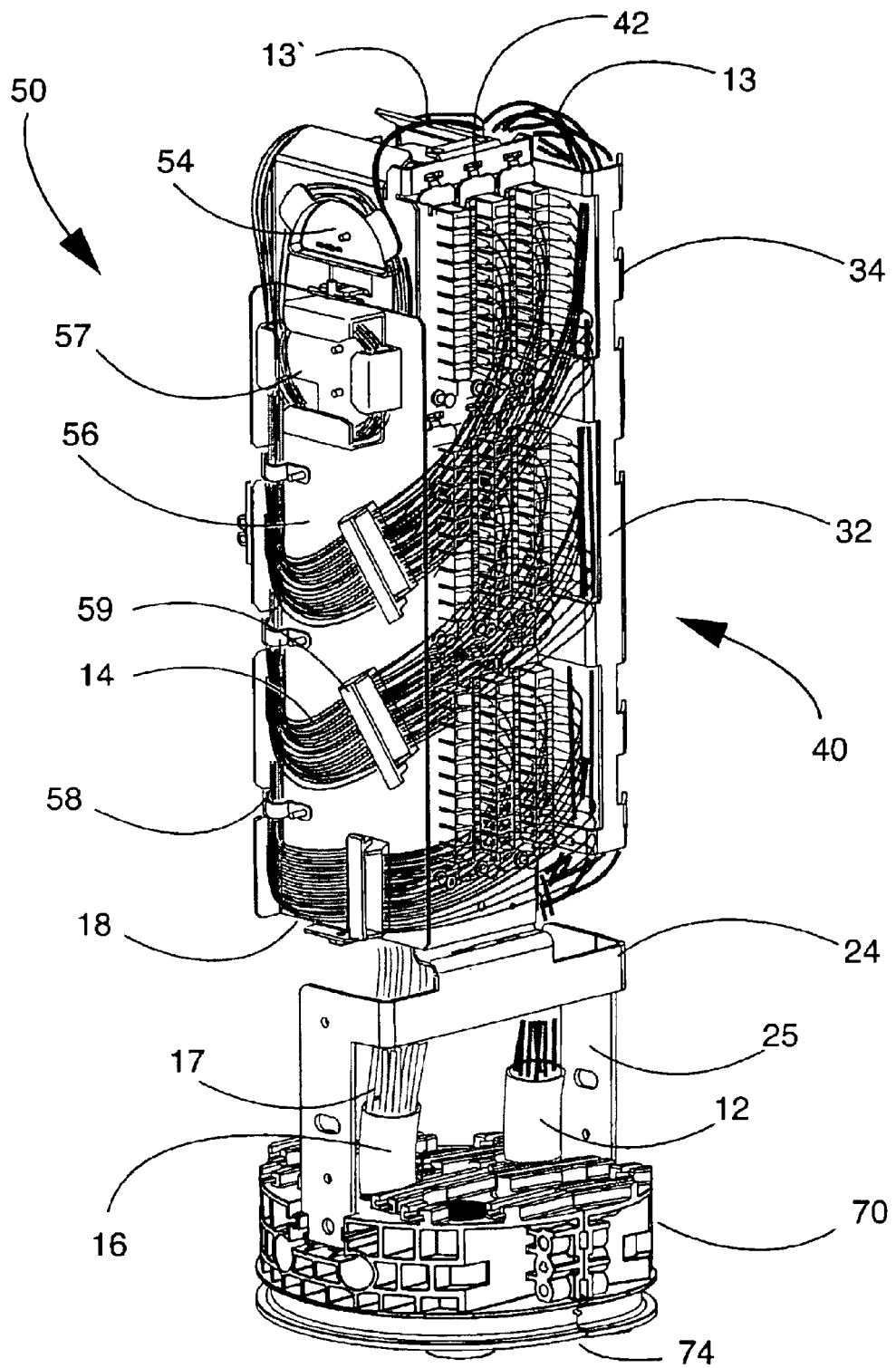
FIG. 3c is a perspective view of the fiber coupling area and the fiber management area of the closure of FIG. 1 shown with the fiber routing panel attached and the closure fully populated with input optical fibers and output optical fibers.

FIGS. 3a–3c are perspective views of the closure 10 showing the fiber coupling area 40 and the fiber management area, indicated generally at 50. As shown, the fiber management area 50 comprises at least one splice tray 52, at least one fiber routing guide 54, and a fiber routing panel 56 attached to the frame 20 adjacent one of the mounting surfaces 22. The routing panel 56 is positioned radially outwardly from the longitudinal axis 21 defined by the frame 20 relative to the splice tray 52 and the routing guide 54. The splice tray 52 is secured to the adjacent mounting surface 22 of the frame 20 in a conventional manner, for example by a wing nut secured on a threaded stud 51 (FIG. 1). The routing panel 56 is likewise secured to the adjacent mounting surface 22 of the frame 20 in a conventional manner, for example by one or more wing nuts secured on threaded studs 55 (FIG. 3a). The buffer tube 13' from the fiber storage area 30 is routed into the fiber management area 50 to the splice tray 52. Inside the splice tray 52, the optical fibers within the buffer tube 13' are splice one-to-one in a known manner to a plurality of input optical fibers 14. The input optical fibers 14 exit the splice tray 52 and are routed around the routing guide 54 onto the routing panel 56. The routing guide 54 is preferably half-moon shaped and has a radius greater than the minimum bend radius of the input optical fibers 14, typically about 1.5 inches. The routing panel 56 comprises a miniature slack basket 57, at least one fiber routing clip 58 and at least one fiber organizer 59. As shown, there are a total of three routing clips 58 and three fiber organizers 59 affixed to the outer surface of the routing panel 56, for a purpose to be described hereinafter. Each routing clip 58 preferably comprises a base for securing the routing clip 58 to the outer surface of the routing panel 56 and a half radius arm for retaining the input optical fibers 14 between the outer surface of the routing panel 56 and the inner surface of the routing clip 58. Each fiber organizer 59 comprises means for separating and guiding the input optical fibers 14 from the fiber management area 50 to the fiber coupling area 40, as will be described hereinafter.

The input optical fibers 14 routed from the routing guide 54 to the routing panel 56 transition into the slack basket 57 where slack lengths of the input optical fibers 14 are stored. For purposes of clarity, only one input optical fiber 14', indicated by the broken line in FIG. 3a, is shown exiting the routing guide 54. However, the input optical fiber 14' shown in FIG. 3a is typical of the plurality of input optical fibers 14 exiting the routing guide 54. The input optical fibers 14 may be uncoated (i.e., bare) individual fibers, but preferably, are coated with a plastic sheath to protect the optical fibers from adverse environmental effects. Furthermore, the input optical fibers 14 may be color-coded to permit ready identification. Preferably, the input optical fibers 14 are each of the same length and the locations of the routing clips 58 and the fiber organizers 59 are such that routing the input optical fibers 14 from the fiber management area 50 to the fiber coupling area 40 requires about the same overall length. The input optical fibers 14 exit the slack basket 57 and are routed to an upper routing clip 58. Certain of the input optical fibers 14 are routed from the upper routing clip 58 to an upper fiber organizer 59. The upper fiber organizer 59 separates the input optical fibers 14 for ready identification and guides the separated optical fibers into an upper portion of the fiber coupling area 40. The remaining input optical fibers 14 are routed to a middle routing clip 58 and certain of the remaining input optical fibers 14 are routed to a middle fiber organizer 59. The middle fiber organizer 59 likewise separates and guides the optical fibers 14 into a middle portion of the fiber coupling area 40. The remaining input optical fibers 14 are routed to a lower routing clip 58 and then from the lower routing clip 58 to a lower fiber organizer 59. The lower fiber organizer 59 likewise separates and guides the input optical fibers 14 into a lower portion of the fiber coupling area 40. In the embodiment shown and described herein, the buffer tube 13' comprises at least nine, and as many as eighteen, individual optical fibers that are spliced to a corresponding number of input optical fibers 14 inside splice tray 52. At least three, and as many as six, of the input optical fibers 14 are routed from the upper routing clip 58 through the upper fiber organizer 59 to the upper portion of the fiber coupling area 40. Likewise, at least three, and as many as six, input optical fibers 14 are routed to the middle routing clip 58 through the middle fiber organizer 59 and to the middle portion of the fiber coupling area 40. Similarly, at least three, and as many as six, input optical fibers 14 are routed to the lower routing clip 58 through the lower fiber organizer 59 and to the lower portion of the fiber coupling area 40.

The coupling area 40 comprises a plurality of coupler modules 42 attached to the frame 20 adjacent one of the mounting surfaces 22. Each coupler module 42 is oriented vertically on the frame 20 parallel to the longitudinal axis 21 defined by the frame 20 and perpendicular to the end cap 70. Each coupler module 42 is attached to the adjacent mounting surface 22 of the frame 20 such that the housing 43 (FIG. 1) of the coupler module 42 extends inwardly into the cavity 23 defined by the frame 20. In the embodiment shown and described herein, a total of nine coupler modules 42 are attached to the mounting surface 22 of the frame 20. Preferably, each of the coupler modules 42 is secured to the frame 20 in the manner illustrated and described hereinafter with reference to FIGS. 7a–7c. Each coupler module 42 divides, or splits, an optical signal carried on an input optical fiber 14 into different optical signals carried on two or more output optical fibers 18 from the buffer tubes 17 of distribution cable 16. Preferably, the coupler module 42 has a plurality of adapters 44 for receiving input optical fibers 14 and output optical fibers 18 having fiber optic connectors on at least one end. Such optical fibers are referred to herein as "pre-connectorized" or "connectorized." As shown, each coupler module 42 comprises a total of ten adapters 44 for receiving connectorized optical fibers. Thus, each coupler module 42 has enough adapters 44 to split a pair of input optical fibers 14 into two sets of four output optical fibers 18 (i.e., a pair of 1×4 couplers), or to split one input optical fiber 14 into eight output optical fibers 18 (i.e., a single 1×8 coupler). Preferably, the uppermost two adapters 44 receive input optical fibers 14 of buffer tube 13' from feeder cable 12 while the lowermost eight adapters 44 receive output optical fibers 18 of buffer tubes 17 from distribution cable 16. This configuration permits the optical fibers to be positioned in a predetermined sequence within the fiber organizers 59. The closure 10 can be configured initially to comprise anywhere from one to nine coupler modules 42, and additional coupler modules 42 may be added later as the remaining capacity of the frame 20 permits. Thus, when fully populated with nine coupler modules 42 (as shown), the closure 10 permits up to 18 input optical fibers 14 to be split into up to 72 output optical fibers 18. As will be described, the 72 output optical fibers 18 may be individual drop cables leading to homes or businesses, or may be branch cables leading to other closures 10 along the optical network, or may be both.

The output optical fibers 18 are routed from the coupler modules 42 in the fiber coupling area 40 to the fiber management area 50 through the fiber organizers 59. For purposes of clarity, only one output optical fiber 18', indicated by the broken line in FIG. 3b, is shown. However, the output optical fiber 18' shown in FIG. 3b is typical of the plurality of output optical fibers 18 exiting the coupler modules 42. The output optical fibers 18 may be uncoated (i.e., bare) individual fibers, but preferably, are coated with a plastic sheath to protect the optical fibers from adverse environmental effects. Furthermore, the output optical fibers 18 may be color-coded to permit ready identification. Preferably, the output optical fibers 18 are each of the same length and the locations of the routing clips 58 and the fiber organizers 59 are such that routing the output optical fibers 18 from the fiber coupling area 40 to the fiber management area 50 requires about the same overall length. The output optical fibers 18 exiting the coupler modules 42 within the upper portion of the fiber coupling area 40 are routed to the upper fiber organizer 59. The upper fiber organizer 59 separates the output optical fibers 18 for ready identification and guides the separated optical fibers to the upper routing clip 58. The output optical fibers 18 exiting the coupler modules 42 within the middle portion of the fiber coupling area 40 are routed to the middle fiber organizer 59. The middle fiber organizer 59 likewise separates the output optical fibers 18 for ready identification and guides the separated optical fibers to the middle routing clip 58. The output optical fibers 18 exiting the coupler modules 42 of the lower portion of the fiber coupling area 40 are routed to the lower fiber organizer 59. The lower fiber organizer 59 likewise separates and guides the output optical fibers 18 to the lower routing clip 58. Slack lengths of the output optical fibers 18 are stored within the slack basket 57 and then routed out of the fiber management area 50 to the fiber connecting area 60.

FIG. 3c shows the fiber coupling area 40 and the fiber management area 50 of a fully populated closure 10 wherein a total of 18 input optical fibers 14 from buffer tube 13' of feeder cable 12 are split by nine coupler modules 42 into a total of 72 output optical fibers 18. The configuration shown in FIG. 3c is for illustration purposes only, and the closure 10 may be configured to have any convenient number of input optical fibers 14, routing clips 58, fiber organizers 59, coupler modules 42, and output optical fibers 18. Furthermore, the closure 10 may be configured initially with fewer than all of the coupler modules 42 and additional coupler modules 42 may be installed later as the remaining capacity of the closure 10 permits. Furthermore, the coupler modules 42 may be mounted adjacent the mounting surface 22 at a angle relative to the longitudinal axis 21 defined by the frame 20 so as to provide improved access to the adapters 44 and connectors, or increased capacity. Similarly, the adapters 44 may be staggered, or angled, or both, relative to the coupler module 42 to likewise provide improved access to the connectors or increased capacity. Finally, the coupling area 40 of the closure 10 may further comprise a fiber connector cover 45 (FIG. 1) for retaining the input optical fibers 14 and the output optical fibers 18 between the coupler modules 42 and the inside surface of the cover 45, to thereby protect the optical fibers when the cover 80 is removed from and replaced onto the end cap 70. The cover 45 may be secured to the mounting surface 22 adjacent the fiber coupling area 40 in any suitable manner.

Figure 4:
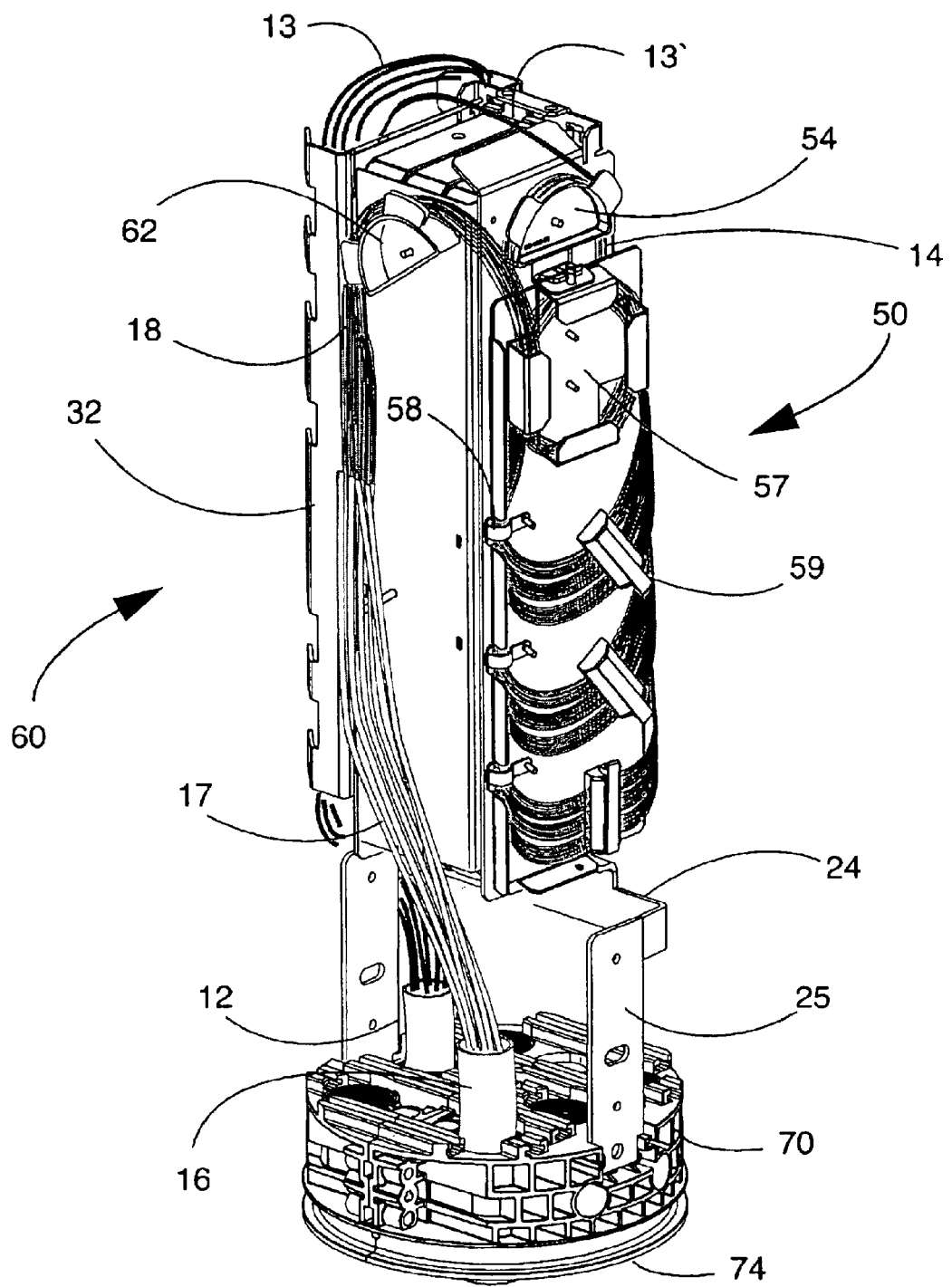
FIG. 4 is a perspective view of the fiber management area and the fiber connecting area of the closure of FIG. 1 illustrating a first embodiment of the closure.

FIG. 4 is a perspective view of the closure 10 showing the fiber management area 50 and a first embodiment of the fiber connecting area, indicated generally at 60. The fiber connecting area 60 comprises a fiber routing guide 62 attached to the frame 20 adjacent one of the mounting surfaces 22. The routing guide 62 is preferably half-moon shaped and has a radius greater than the minimum bend radius of the output optical fibers 18, typically about 1.5 inches. The routing guide 62 receives the output optical fibers 18 from the slack basket 57 of the fiber management area 50 and guides the output optical fibers 18 into alignment with the buffer tubes 17 of the distribution cable 16 without exceeding the minimum bend radius of the output optical fibers 18. The buffer tubes 17 may be secured to the mounting surface 22 of the frame 20 adjacent the fiber connecting area 60 by one or more cable ties to protect the optical fibers from damage when the cover 80 is removed from or replaced onto the end cap 70. The configuration illustrated in FIG. 4 is typically utilized to permit a field technician to field terminate selected optical connections by interconnecting at least one input optical fiber 14 of buffer tube 13' from feeder cable 12 with two or more pre-connectorized output optical fibers 18 of the buffer tubes 17 from distribution cable 16, for example drop cables or branch cables, through one or more coupler modules 42 provided within fiber coupling area 40.

Figure 5:
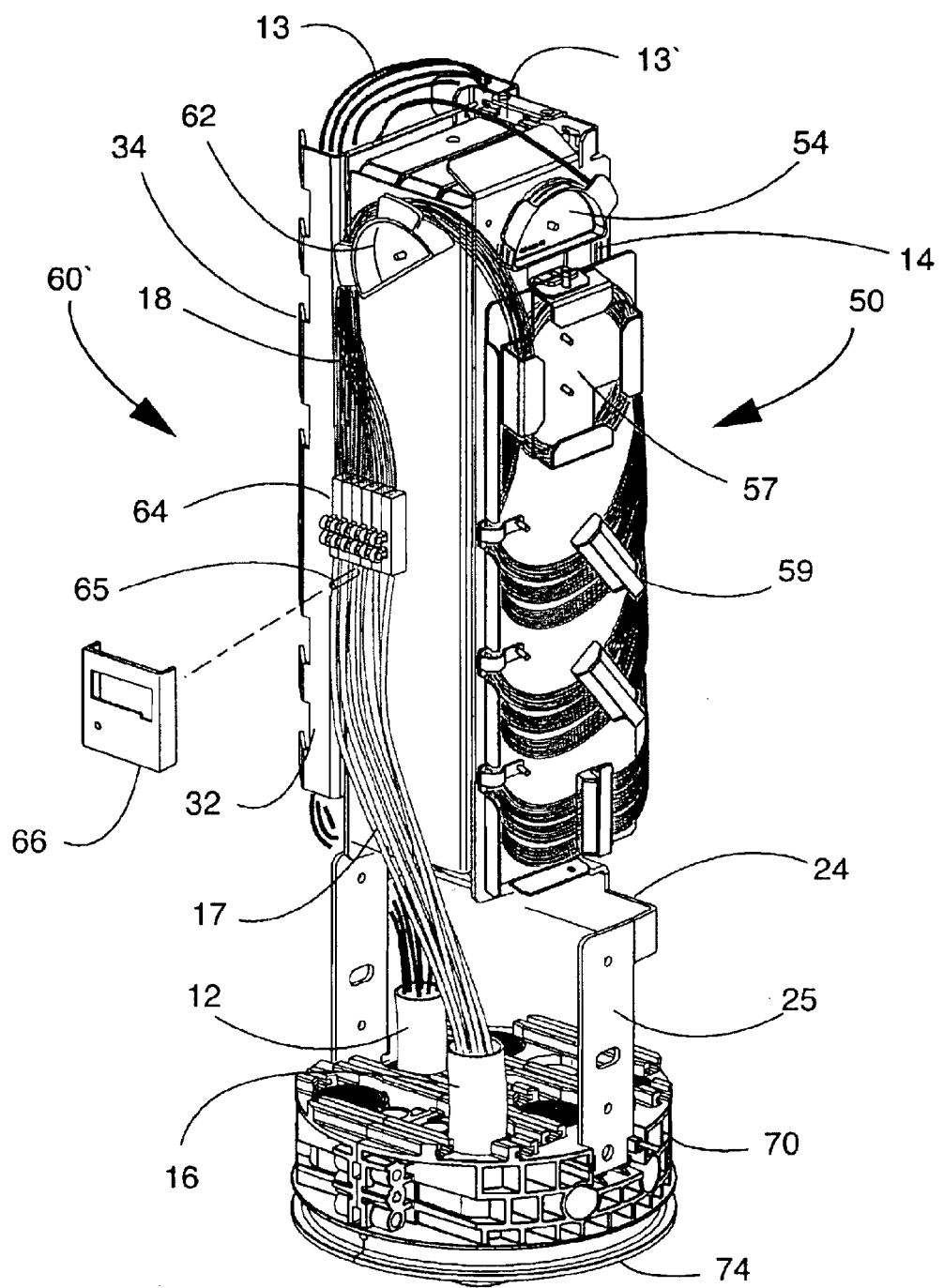
FIG. 5 is a perspective view of the fiber management area and the fiber connecting area of the closure of FIG. 1 illustrating a second embodiment of the closure.

FIG. 5 is a perspective view of the closure 10 showing the fiber management area 50 and a second embodiment of the fiber connecting area, indicated generally at 60'. The fiber connecting area 60' comprises the fiber routing guide 62 previously described and at least one buffer tube fanout kit 64 having a plurality of fanout connectors attached to the mounting surface 22 of the frame 20. The fiber connecting area 60' may further comprise a bracket 66 for protecting the fanout kit 64 from damage when the cover 80 is removed from or replaced onto the end cap 70. The bracket 66 may be secured to the fanout kit 64 or the mounting surface 22 in any suitable manner, but preferably, is secured by a wing nut secured on a threaded stud 65. The configuration illustrated in FIG. 5 is typically utilized to permit a filed technician to field terminate selected optical connections by interconnecting at least one input optical fiber 14 of buffer tube 13' from feeder cable 12 with two or more pre-connectorized output optical fibers 18 of the buffer tubes 17 from distribution cable 16, for example drop cables or branch cables, through one or more coupler modules 42 provided within fiber coupling area 40 and one or more fanout kits 64 provided within fiber connecting area 60'.

Figure 6:
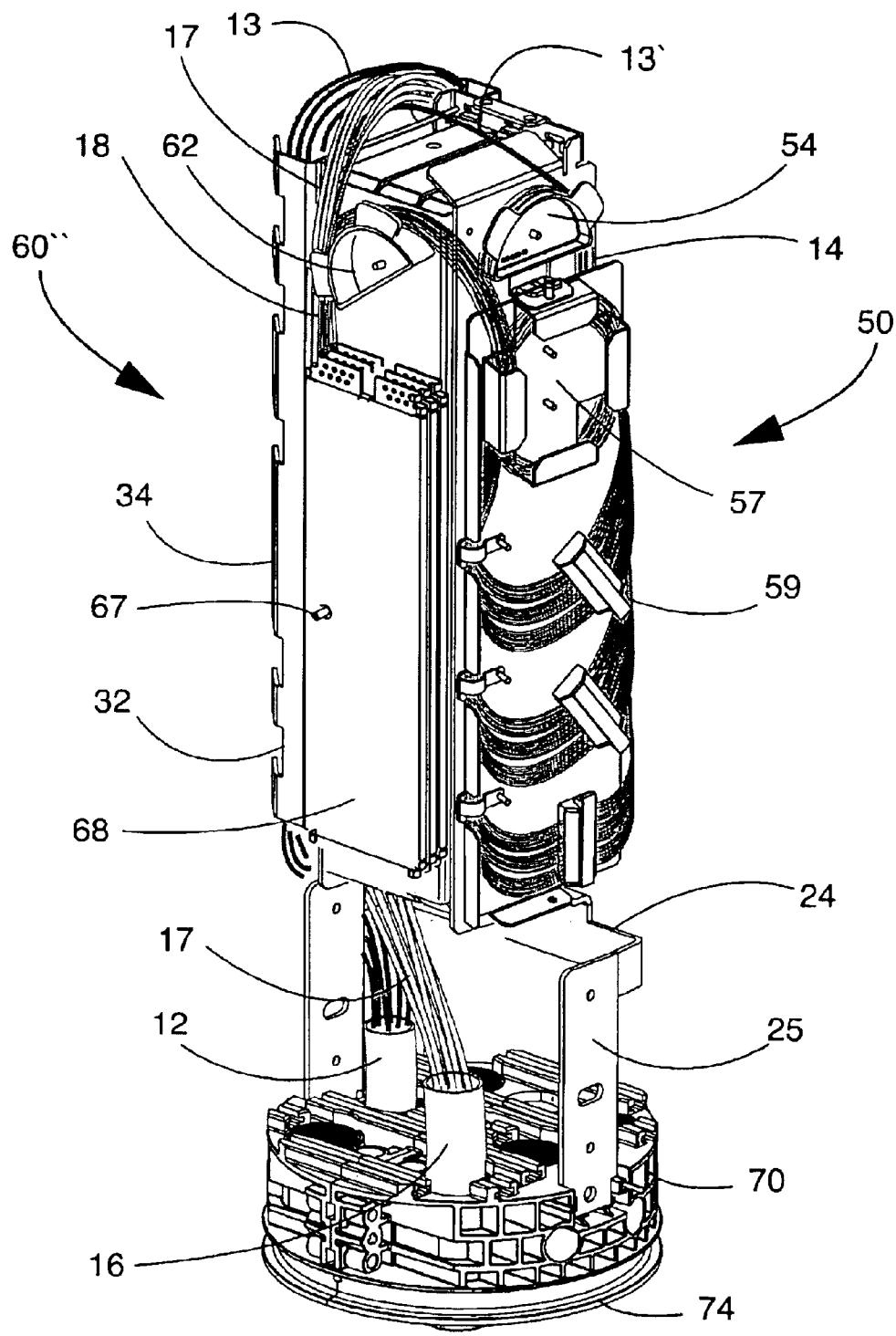
FIG. 6 is a perspective view of the fiber management area and the fiber connecting area of the closure of FIG. 1 illustrating a third embodiment of the closure.

FIG. 6 is a perspective view of the closure 10 showing the fiber management area 50 and a third embodiment of the fiber connecting area, indicated generally at 60". The fiber connecting area 60" comprises the fiber routing guide 62 previously described and at least one splice tray 68 attached to the mounting surface 22 of the frame 20. The splice trays 68 may be secured to the mounting surface 22 in any suitable manner, but preferably, are secured by a wing nut secured on a threaded stud 67. The output optical fibers 18 are guided from the routing guide 62 into the splice trays 68 and are spliced to optical fibers of the buffer tubes 17 of distribution cable 16. The buffer tubes 17 of distribution cable 16 are routed first into the slack storage basket 32 of fiber storage area 30, and then from fiber storage area 30 to the splice trays 68 in fiber connecting area 60". The buffer tubes 17 are preferably routed from the fiber storage area 30 to the fiber connecting area 60" between the free end of the frame 20 and the inside of the cover 80. However, the buffer tubes 17 may be routed from the fiber storage area 30 to the fiber connecting area 60" in any expedient manner that does not exceed the minimum bend radius of the optical fibers within the buffer tubes 17. The buffer tubes 17 may be secured by cable ties or other means as necessary to protect the buffer tubes 17 from damage when the cover 80 is removed from or replaced onto the end cap 70. The configuration illustrated in FIG. 6 is typically utilized to permit a field technician to field terminate selected optical connections by interconnecting and mechanically splicing at least one input optical fiber 14 of buffer tube 13' from feeder cable 12 with two or more output optical fibers 18 of the buffer tubes 17 from distribution cable 16, for example drop cables or branch cables, through one or more coupler modules 42 provided within fiber coupling area 40 and one or more splice tray 68 provided within fiber connecting area 60".

Figure 7A:
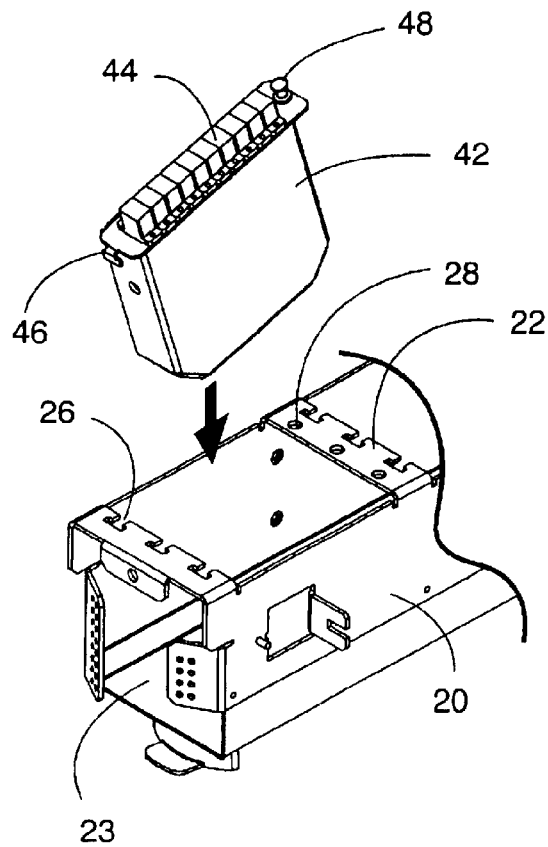
FIGS. 7A–7C are detail perspective views showing a typical coupler module constructed in accordance with the invention and illustrating a method of attaching the coupler module to the frame of the closure of FIG. 1.
Figure 7B:
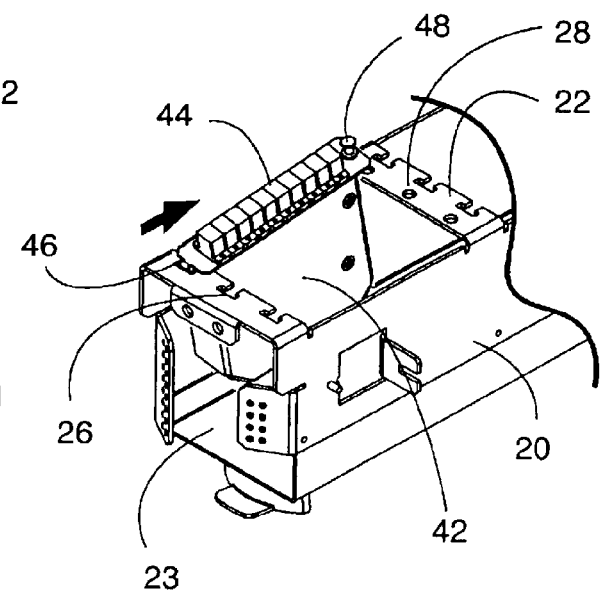
Figure 7C:
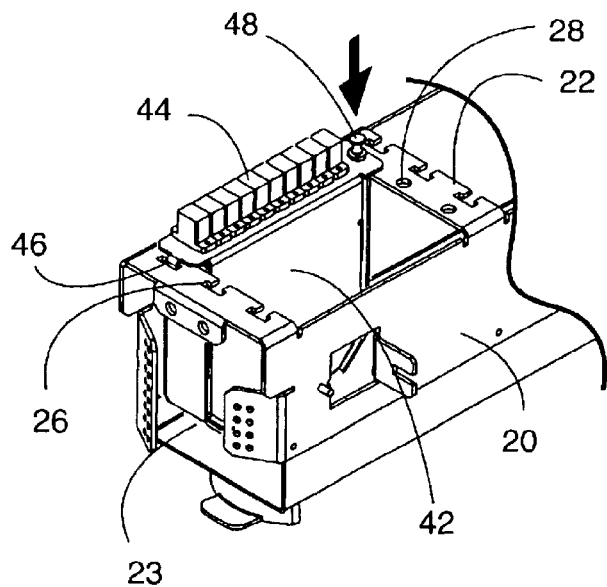

FIGS. 7a–7c illustrate a method for securing the coupler modules 42 to the adjacent mounting surface 22 of the frame 20. In the embodiment shown and described herein, each coupler module 42 is provided with a hook 46 at one end and a latch plunger 48 at the opposite end. The mounting surface 22 is provided with a complimentary opening 26 for receiving the hook 46 and a complimentary latch grommet 28 for receiving the latch plunger 48. The coupler module 42 is inserted into the cavity 23 defined by the frame 20 such that the hook 46 is received within the corresponding opening 26 formed in the mounting surface 22 (FIG. 7a). The coupler module 42 is then moved in a direction generally parallel to the longitudinal axis 21 defined by the frame 20 towards the end cap 70 until the latch plunger 48 overlies the latch grommet 28 provided in the mounting surface 22 (FIG. 7b). The coupler module 42 is then moved in a direction generally perpendicular to the longitudinal axis 21 defined by the frame 20 until the latch plunger 48 engages the latch grommet 28 (FIG. 7c). The coupler module 42 may be removed from the frame 20 by pulling the latch plunger 48 radially outwardly and reversing the steps illustrated in FIGS. 7c, 7b, and 7a, respectively.

Figure 8A:
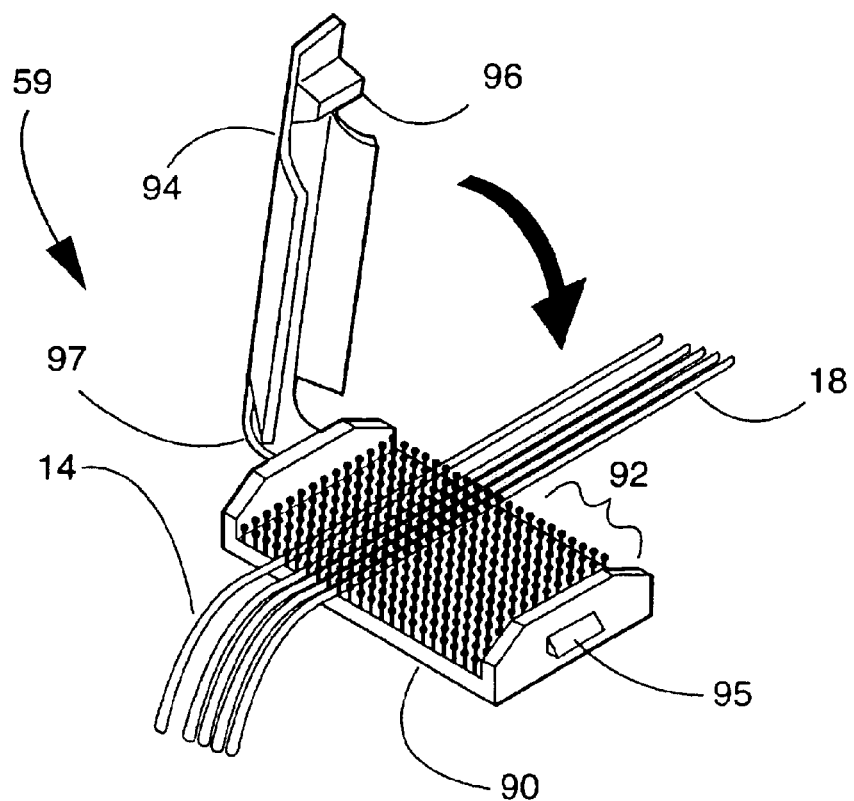
FIGS. 8A and 8B are detail perspective views showing a typical fiber organizer constructed in accordance with the invention and illustrating a method of routing and separating the input optical fibers and the output optical fibers within the closure of FIG. 1.
Figure 8B:
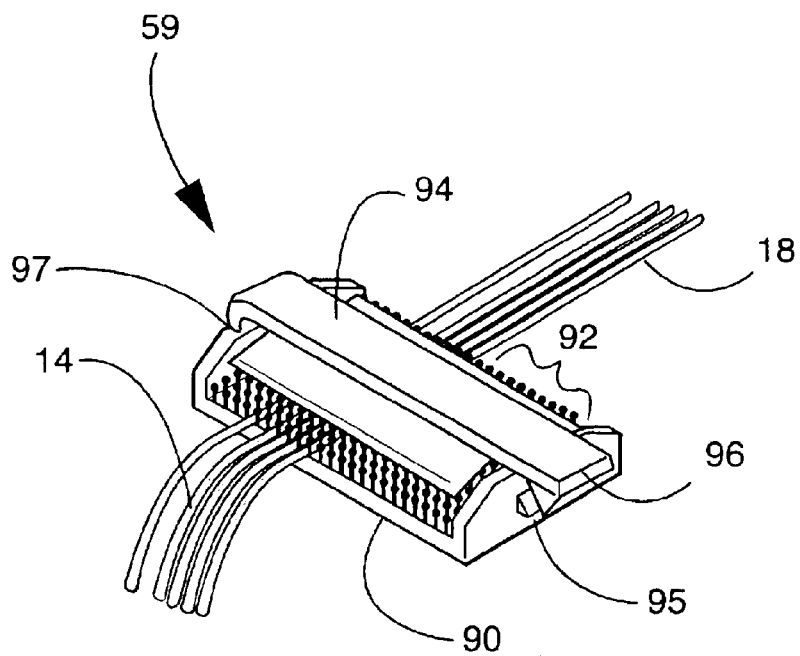

FIGS. 8a and 8b illustrate a method of routing and separating the input optical fibers 14 and the output optical fibers 18 using the fiber organizer 59 of the present invention. The fiber organizer 59 comprises a base 90, a plurality of rows of hook elements 92 depending from the base 90, and a lid 94 hingedly attached to the base 90 for separating, guiding, and securely retaining optical fibers, such as 900 micron fiber, within the fiber management area 50 of the closure 10. The base 90 and the lid 94 may be made of any lightweight, resilient material, but preferably, are made of plastic or nylon. As shown, the base 90 is generally planar and rectangular shaped having a lengthwise dimension of about 4 inches and a transverse dimension of about 2 inches. However, the base 90 may have any shape or size that is suitable for receiving and retaining the desired number of optical fibers. The base 90 may be attached to the routing panel 56 of the fiber management area 50 by adhesive or one or more rivets, screws, or other suitable fasteners. It has been found that the functionality of the base 90 and the lid 94 may be provided by a flat cable mount of the type available from Panduit Corporation of Tinley Park, Ill. The hook elements 92 may be made of any lightweight, resilient material, but preferably are made of polyolefin or synthetic rubber. It has been found that the functionality of the hook elements 92 may be provided by the hooks utilized in "hook and loop" type fasteners, such as the well known and widely used VELCRO®. A particularly suitable material is the dual lock reclosable fastener available from 3M Corporation of Minneapolis, Minn. under part number SJ3541. The transverse rows of hook elements 92 separate and guide the input optical fibers 14 (one shown) and the output optical fibers 18 (four shown) so that a field technician may readily identify a particular optical fiber. The base 90 is also provided with a protruding latch 95 along one transverse edge for engaging a lip 96 provided adjacent the free end of the lid 94. One or more input optical fibers 14 and two or more output optical fibers 18 are positioned between adjacent rows of hook elements 92 and the lid 94 is rotated about a living hinge 97 from an opened position to a closed position wherein the lip 96 of the lid 94 engages the latch 95 on the base 90. As a result, the input optical fibers 14 and the output optical fibers 18 are separated and securely retained in place within the fiber organizer 59 when the lid 96 is moved to the closed position on the base 90.

The illustrative embodiments of the closure shown and described herein provide a number of significant advantages over previously known closures, such as conventional splice closures. For purposes of example only, and not by way of limitation, a closure constructed in accordance with the invention provides substantially greater capacity than a conventional splice closure as a result of the incorporation of coupler modules. Furthermore, a closure constructed in accordance with the invention provides substantially greater capacity as a result of the efficient use of the space available within the closure for fiber storage, fiber coupling, fiber management, and fiber connecting components. Still further, a closure constructed in accordance with the invention provides a field technician with substantially greater ease and flexibility in re-configuring the optical fiber connections within the closure. Still further, a closure constructed in accordance with the invention provides at least three different options for interconnecting at least one optical fiber from a feeder cable with two or more optical fibers of a distribution cable. In particular, the closure of the present invention permits a field technician to terminate at least one optical fiber from a feeder cable with two or pre-connectorized drop cables, with two or more drop cables through a fanout kit having a plurality of fanout connectors, or with two or more drop cables through at least one mechanical splice tray.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed herein and that further modifications and other embodiments are intended to be included within the scope of the appended claims. Although specific terms are employed herein, they are used in a generic and descriptive sense only and not for purposes of limitation.

That which is claimed is:

1. A closure for interconnecting at least one optical fiber of a feeder cable with two or more optical fibers of a distribution cable, the closure comprising:

a frame defining a longitudinal axis;

an end cap affixed to the frame and having at least one opening therethrough for receiving the feeder cable and at least one opening therethrough for receiving the distribution cable;

a fiber coupling area comprising a plurality of coupler modules for splitting an optical signal carried by the at least one optical fiber of the feeder cable into two or more optical signals carried by the two or more optical fibers of the distribution cable, the coupler modules removably attached to a first mounting surface defined by the frame that is parallel to the longitudinal axis; and a fiber management area for routing the at least one optical fiber of the feeder cable to the fiber coupling area and for routing the two or more optical fibers of the distribution cable from the fiber coupling area, the fiber management area positioned adjacent a second mounting surface defined by the frame that is parallel to the longitudinal axis and is not parallel to the first mounting surface;

wherein the optical fiber of the feeder cable and the optical fibers of the distribution cable are connectorized; and wherein each of the coupler modules comprises a plurality of adapters for receiving the connectorized optical fiber of the feeder cable and the connectorized optical fibers of the distribution cable, the adapters mounted on the coupler modules in a linear array that is parallel to the longitudinal axis.

2. A closure according to claim 1 wherein the frame defines a cavity and each of the coupler modules comprises a housing that is positioned within the cavity such that the housing is parallel to the longitudinal axis defined by the frame.

3. A closure according to claim 1 wherein each of the coupler modules comprises a housing having a hook at one end that is received within a hook opening formed in the first mounting surface and a latch plunger at the opposite end that engages a grommet provided in the first mounting surface to secure the coupler module to the first mounting surface.

4. A closure according to claim 1 wherein the fiber management area comprises at least one splice tray, at least one fiber routing guide, and a fiber routing panel.

5. A closure according to claim 4 wherein the fiber routing panel is positioned radially outwardly from the at least one splice tray and comprises at least one fiber routing clip and at least one fiber organizer.

6. A closure according to claim 5 wherein the fiber organizer comprises a base attached to the fiber routing panel, a lid movably attached to the base for movement between an opened position and a closed position, and a plurality of hook elements that define spaced apart rows for separating and guiding at least one optical fiber of the feeder cable and the two or more optical fibers of the distribution cable, the lid securing the optical fiber of the feeder cable and the optical fibers of the distribution cable between the rows of hook elements when the lid is moved to the closed position.

7. A closure according to claim 1 further comprising a fiber storage area for storing a slack length of the feeder cable.

8. A closure according to claim 7 wherein the fiber storage area comprises a slack storage basket having at least one flange for retaining the slack length of the feeder cable.

9. A closure according to claim 7 wherein the fiber management area and the fiber storage area are generally parallel and spaced apart.

10. A closure according to claim 1 further comprising a fiber connecting area.

11. A closure according to claim 1 wherein the two or more optical fibers of the distribution cable are pre-connectorized drop cables.

12. A closure according to claim 10 wherein the fiber connecting area comprises at least one fanout kit having a plurality of fanout connectors for interconnecting the two or more optical fibers of the distribution table with a plurality of optical fibers of drop cables.

13. A closure according to claim 10 wherein the fiber connecting area comprises a splice tray for interconnecting two more optical fibers of the distribution with a plurality of optical fibers of drop cables.

14. A closure for interconnecting an input optical fiber with a plurality of output optical fiber, the closure comprising:
a frame defining a longitudinal axis and a plurality of mounting surfaces;
a fiber coupling area adjacent a first one of the mounting surfaces comprising a plurality of removable coupler modules for splitting an optical signal carried by the input optical fiber of the feeder cable into a plurality of optical signals carried by the output optical fibers, the first mounting surface generally parallel to the longitudinal axis; and
a fiber management area adjacent a second one of the mounting surfaces for routing the input optical fiber to the fiber coupling area and for routing the output optical fibers from the fiber coupling area, the second mounting surface generally parallel to the longitudinal axis and not parallel to the first mounting surface;
wherein the input optical fiber and the output optical fibers are connectorized; and
wherein each of the coupler modules comprises a plurality of adapters for receiving the connectorized input optical fiber and the connectorized output optical fibers, the adapters mounted on the coupler modules in a linear array that is parallel to the longitudinal axis.

15. A closure according to claim 14 wherein the frame defines a cavity and each of the coupler modules comprises a housing that is positioned within the cavity such that the housing is parallel to the longitudinal axis defined by the frame.

16. A closure according to claim 14 wherein each of the coupler modules comprises a housing having a hook at one end that is received within a hook opening formed in the first mounting surface and a latch plunger at the opposite end that engages a grommet provided in the first mounting surface to secure the coupler module to the first mounting surface.

17. A closure according to claim 14 wherein the fiber management area comprises at least one splice tray, at least one fiber routing guide, and a fiber routing panel.

18. A closure according to claim 17 wherein the fiber routing panel is positioned radially outwardly from the at least one splice tray and comprises at least one fiber routing clip and at least one fiber organizer.

19. A closure according to claim 18 wherein the fiber organizer comprises a base attached to the fiber routing panel, a lid movably attached to the base for movement between an opened position and a closed position, and a plurality of hook elements that define spaced apart rows for separating and guiding the input optical fiber and the output optical fibers, the lid securing the input optical fiber and the output optical fibers between the rows of hook elements when the lid is moved to the closed position.

20. A closure according to claim 14 further comprising a fiber storage area adjacent a third one of the mounting defined by the frame for storing a slack length of the feeder cable.

21. A closure according to claim 20 wherein the fiber storage area comprises a slack storage basket having at least one flange for retaining the slack length of the feeder cable.

22. A closure according to claim 20 wherein the second mounting surface adjacent the fiber management area and the third mounting surface adjacent the fiber storage area are generally parallel and spaced apart.

23. A closure according to claim 14 further comprising a fiber connecting area adjacent a fourth one of the mounting surface defined by the frame.

24. A closure according to claim 14 wherein the output optical fibers are pre-connectorized drop cables.

25. A closure according to claim 23 wherein the fiber connecting area comprises at least one fanout kit having a plurality of fanout connectors for interconnecting the output optical fibers with a plurality of optical fibers of drop cables.

26. A closure according to claim 23 wherein the fiber connecting area comprises a splice tray for interconnecting output optical fibers with a plurality of optical fibers of drop cables.

27. A closure for interconnecting an input optical fiber with a plurality of output optical fibers, the closure comprising:
a frame defining a longitudinal axis;
a housing affixed to the frame and having at least one opening therethrough for receiving the input optical fiber and at least one opening therethrough for receiving the output optical fibers;
a fiber coupling area comprising a plurality of coupler modules for splitting an optical signal carried by the input optical fiber into two or more optical signals carried by the output optical fibers, the coupler modules removable attached to a first mounting surface defined by the longitudinal axis and is not parallel to the longitudinal axis;
a fiber management area for routing the input optical fiber to the fiber coupling area and for routing the output optical fibers from the fiber coupling area, the fiber management area adjacent a second mounting surface defined by the frame that is parallel to the longitudinal axis and is not parallel to the first mounting surface; and a fiber organizer for separating and guiding the output optical fibers comprising
   a base defining a mounting surface; and
   a plurality of hook elements attached to the mounting surface and arranged in spaced apart rows to receive the output optical fibers therebetween;
wherein the input optical fiber and the output optical fibers are connectorized; and
wherein each of the coupler modules comprises a plurality of adapters for receiving the connectorized input optical fiber and the connectorized output optical fibers, the adapters mounted on the coupler modules and arranged in a linear array that is parallel to the longitudinal axis.

28. A closure according to claim 27 wherein the output optical fibers are pre-connectorized drop cables.

29. A closure according to claim 27 further comprising a lid movably attached to the base for movement between an opened position and a closed position, the lid securing the output optical fibers between the rows of hook elements when the lid is moved to the closed position.

30. A closure according to claim 29 wherein the lid comprises a lip and the base comprises a protruding latch and wherein the lip of the lid engages the latch of the base when the lid is moved to the closed position.

* * * * *